United States Patent [19]

Ferlin

[11] 4,356,810

[45] Nov. 2, 1982

[54] PLURAL BURNER GAS COOKER

[75] Inventor: William J. Ferlin, 2051 Twelfth St., Detroit, Mich. 48216

[73] Assignee: William J. Ferlin, Detroit, Mich.

[21] Appl. No.: 234,660

[22] Filed: Feb. 17, 1981

[51] Int. Cl.³ .............................. A47J 37/00; F24C 3/00
[52] U.S. Cl. .................................. 126/41 R; 239/565; 431/278
[58] Field of Search .................... 126/40, 41 R, 25 R; 431/278; 239/536, 565

[56] References Cited

U.S. PATENT DOCUMENTS

| 2,142,014 | 12/1938 | Zink | 239/565 |
| 2,344,936 | 3/1944 | Zink | 239/565 |
| 3,638,635 | 2/1972 | Drennan | 126/41 R |
| 4,092,975 | 6/1978 | Grammatopoulos | 126/41 R |

Primary Examiner—Ronald C. Capossela
Attorney, Agent, or Firm—Barnes, Kisselle, Raisch, Choate, Whittemore & Hulbert

[57] ABSTRACT

In an outdoor type gas fired cooker supported on a hollow stanchion containing a valve for each of a plurality of burner sections and a mixing tube extending between each valve and a burner section, the stanchion having an opening for access to the valve controls and shuttered primary air openings in the mixing tubes, the improvement wherein the upstream ends of the mixing tubes are secured against displacement relative to the valve outlets owing to thermal warpage by a strut-tie member secured to the mixing tubes adjacent the primary air shutters, this member having an extension which passes through a slot in a wall of the cooker to facilitate insertion of the mixing tubes into the stanchion only when the shutters are facing in the proper direction for access through the stanchion opening.

12 Claims, 8 Drawing Figures

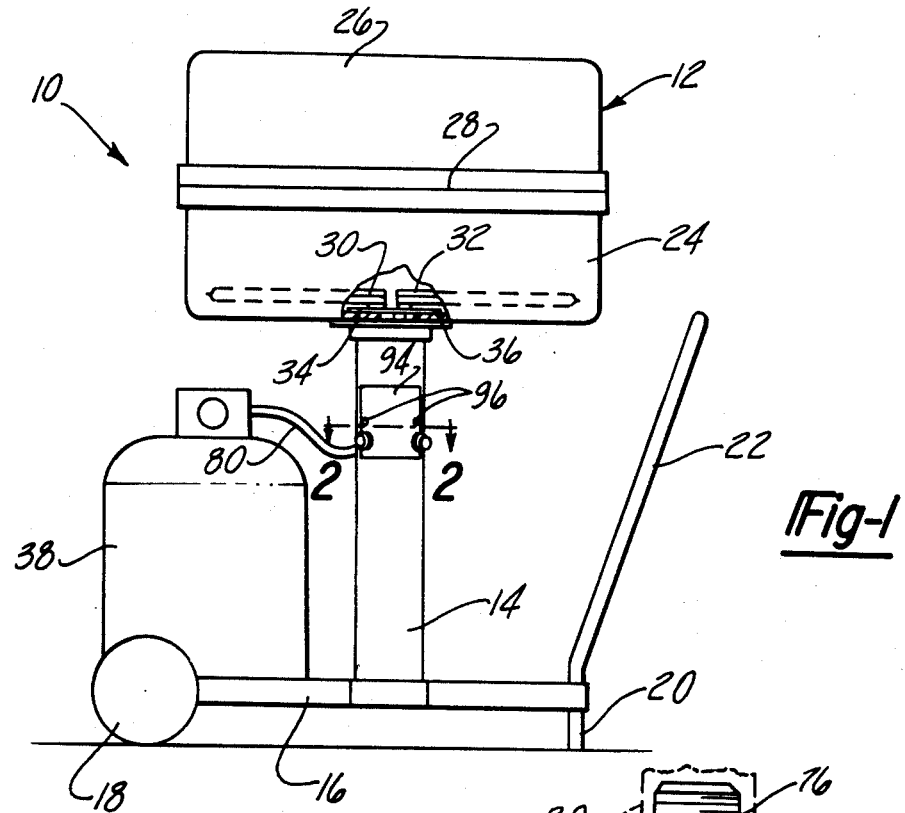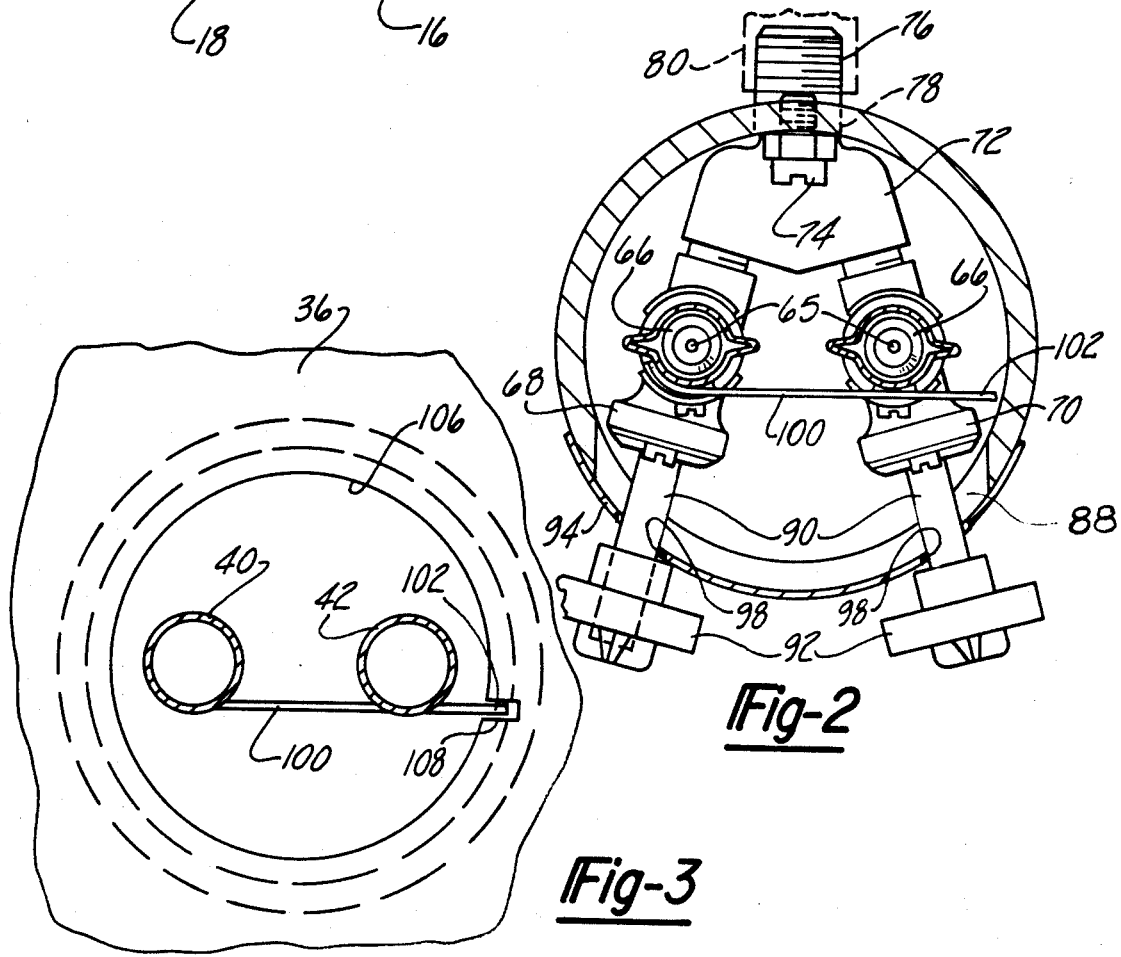

PLURAL BURNER GAS COOKER

This invention relates generally to gas burner assemblies of the type typically used in outdoor barbecue grills and, more particularly, to burner assemblies having a plurality of individual burners, each furnished with fuel gas through its own valve and mixing tube. The valves are mounted on a tubular stanchion which supports the body of the barbecue grill and the outlet ports of the valves are within the stanchion tube. The mixing tubes extend downwardly from the bases of their respective burners.

To assemble these parts, the burners are lowered onto the bottom of the grill body and during this movement, the mixing tubes lower in the stanchion tube to a position in which their upstream ends are in gas receiving relation to the outlet ports of the respective valves. When the mixing tubes are correctly assembled, primary air shutters thereon are aligned with an access opening in the stanchion tube. The operating handles for the valve project through this opening to the exterior of the stanchion tube.

The conventional structure described above is subject to drawbacks. First, it is possible to assemble the mixing tubes with the valves in such a position that the primary air shutters on the mixing tubes face away from the access opening rather than being aligned therewith so that it is impossible to adjust these shutters. Second, barbecue grills of the type under consideration generate sufficient heat to cause thermal warpage of the burner-mixing tube assembly, in turn causing the upstream ends of the mixing tubes to become misaligned with respect to the outlet ports of the valves. This results in inefficient functioning or malfunctioning of the burners.

The object of the present invention is to provide in an assembly of the type under consideration, a very simple inexpensive structure improved to eliminate the drawbacks discussed above. In the accompanying drawings, FIG. 1 is a side elevation view of a barbecue grill embodying the present invention with portions broken away and shown in section.

FIG. 2 is an enlarged scale sectional view on line 2—2 of FIG. 1.

FIG. 3 is a sectional view on line 3—3 of FIG. 4.

Figure 5:
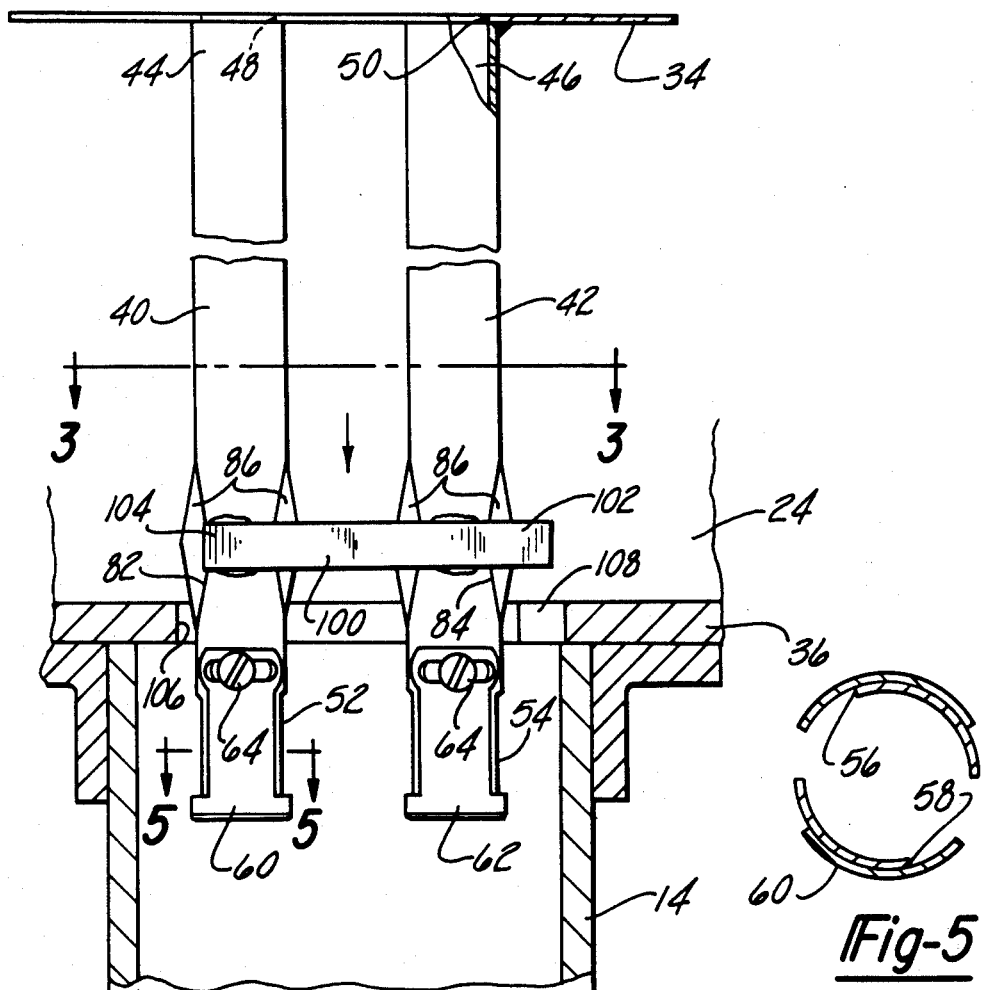
FIG. 5 is a somewhat enlarged scale sectional view on line 5—5 of FIG. 4.
Figure 4:
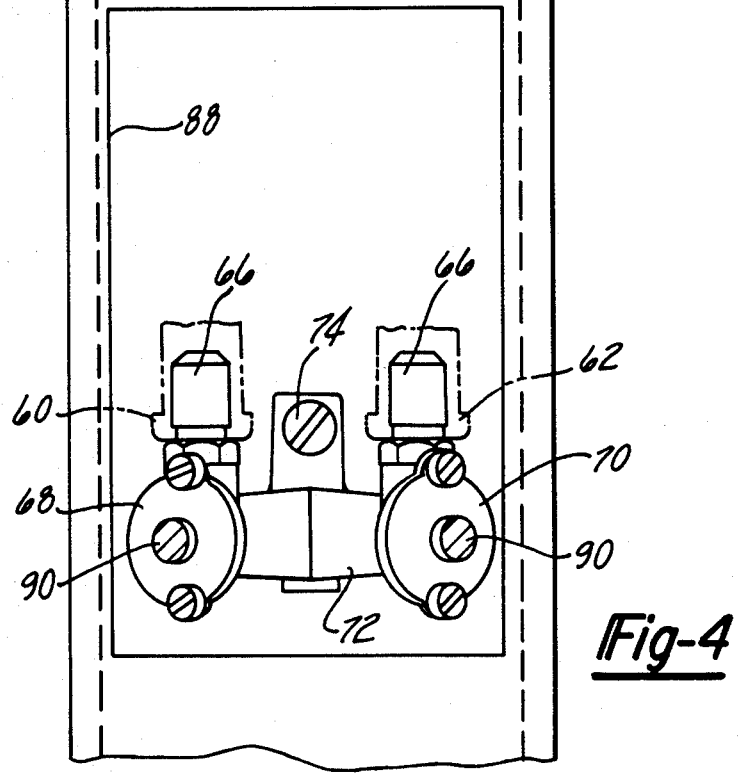
FIG. 4 is a view partly in front elevation and partly in vertical section illustrating a step in assembling the burner assembly.

Shown in the drawings is an outdoor barbecue grill 10 which comprises a grill housing 12 supported upon a hollow tubular stanchion 14 in turn mounted on a frame 16. One end of the frame is supported by ground engaging wheels 18 while the other end is supported by one or more legs 20. A handle 22 projects upwardly from frame 16 to facilitate moving grill 10 from place to place. Housing 12 comprises a tub-shaped base 24 and a cover 26 which can be swung or otherwise moved to and from closing relation to the open top of base 24. In closed condition of the housing, base 24 and cover 26 meet at a parting line 28. The food supporting grill (not shown) is supported by an upper portion of base 24 somewhat below the parting line.

Two gas burners 30,32 are secured as by welding to a common anchor plate 34 supported by the bottom 36 of housing base 24. Burners 30,32 are furnished with fuel gas from any suitable source such as a liquid petroleum bottle 38 through individual controls as is brought out more in detail below. Typically, a layer of simulated charcoal briquettes (not shown) is supported above burners 30,32. When one or more of the burners is in operation, the briequettes are heated to incandescence or nearly so, and provide radiant heat for cooking foods contained in grill housing 12.

A pair of mixing tubes 40,42 are fixed by suitable means to anchor plate 34 so that their downstream end portions 44,46 communicate with the interiors of burners 30,32 respectively through openings 48,50 in plate 34. Mixing tubes 40,42 have upstream end portions 52,54 provided with primary air openings 56,58, the effective sizes of which are controlled by rotatable shutters 60,62, each secured in adjusted condition by a screw 64. Fuel gas is introduced into the upstream ends 52,54 of the mixing tubes through ports 65 (FIG. 2) in the outlet hoods 66 of a pair of gas valves 68,70 mounted on a manifold block 72 anchored on the interior of post 14 by a mounting screw 74. Block 72 has a nipple 76 which projects to the exterior of post 14 through an opening 78 and to which gas is furnished from source 38 through a tube 80.

Mixing tubes 40,42 have venturi throats or restrictions 82,84 respectively, usually formed by pinching the side walls of the tubes as at 86. When valves 68,70 are open, fuel gas flows from bottle 38 through tubing 80 and nipple 76 into manifold block 72 and from there through the valves and their outlet ports 65, through mixing tubes 40,42 and into burners 30,32. The fuel gas issuing from ports 65 entrains primary air through openings 56,58 which is effectively mixed with the fuel gas in venturi throats 82,84. In properly assembled relation of the parts, primary air shutters 60,62 are accessible for adjustment through an opening 88 in post 14. Operating stems 90 on valves 68,70 project outwardly through this opening and are usually provided with operating handles 92. Typically, opening 88 is closed by a removable cover plate 94 secured in place by screws 96 and having suitable openings 98 (FIG. 2) through which operating stems 90 project. The structure thus far described is conventional.

In accordance with the invention, a combined tie and strut member 100 is anchored to and extends laterally between mixing tubes 40,42 as closely adjacent their upstream ends 52,54 as is practicable. In the form of the invention illustrated in FIGS. 2-5, member 100 comprises essentially a flat metal strap secured as by welding or by soldering to the throat portions of venturi restrictions 82,84. Strap 100 has a free end portion 102 which extends laterally outwardly of one of the mixing tubes such as tube 42. The other end portion 104 of strap 100 may be shaped to fit the curvature of venturi throat 82, but not necessarily so. In either case, end 104 does not project laterally outwardly of mixing tube 40.

Bottom 36 of base 24 has an opening 106 whose diameter is somewhat larger than the overall lateral extent of mixing tubes 40,42, but which, in general, is smaller than the overall lateral extent of the mixing tubes plus end 102 of strap 100. To accommodate this larger lateral dimension, bottom 36 is provided with a slot 108 which opens into and extends away from opening 106. Slot 108 is positioned so that when end 102 of strap 100 enters the slot, primary air shutters 60,62 face in a direction toward access opening 88.

To mount the assembly of burners 30,32, anchor plate 34 and mixing tubes 40,42 in the grill, the assembly is positioned so that the mixing tubes are vertically aligned with opening 106. The assembly is then lowered so that ends 52,54 of the mixing tubes pass downwardly through the opening to approximately the position shown in solid lines in FIG. 4. Upon further lowering, if shutters 60,62 are not properly oriented with respect to access opening 88, end 102 of strap 100 will be out of alignment with slot 108, will strike an unslotted portion of bottom 36, and will prevent the assembly from being lowered further into stanchion 14.

Should this occur, the assembler rotates the assembly until end 102 aligns with slot 108. Then upon continued lowering of the assembly, end 102 passes through 108, and the assembly is lowered further until the bottoms of burners 30,32 rest on bottom 36 of grill base 24, at which time the lower (upstream) ends 50,52 of the mixing tubes and their respective shutters 60,62 are positioned around outlet hoods 66 of gas valves 68,70 as represented in dotted lines in FIG. 4. Shutters 60,62 are properly aligned with access opening 88 to facilitate their adjustment.

During use of grill 10, sufficient heat is generated to cause thermal warpage of burners 30,32 and possibly upper end portions 44,46 of the mixing tubes. In the conventional grill, such warpage results in lateral shifting of the upstream end portions 52,54 of the mixing tubes with respect to outlet ports 65 of the gas valves. When this happens, fuel gas issuing from the ports enters the mixing tubes in an off-center or non-axial direction, primary air is not properly entrained through openings 56,58 and burners 30,32 function improperly or inefficiently. However, the use of tie-strut 100 eliminates or reduces to insignificance this thermal-warpage-induced shifting of tube ends 52,54. Member 100 is preferably located as closely as practicable to ends 52,54 in order to obtain the maximum bracing effect on the tubes.

Figures 6, 7, 8:
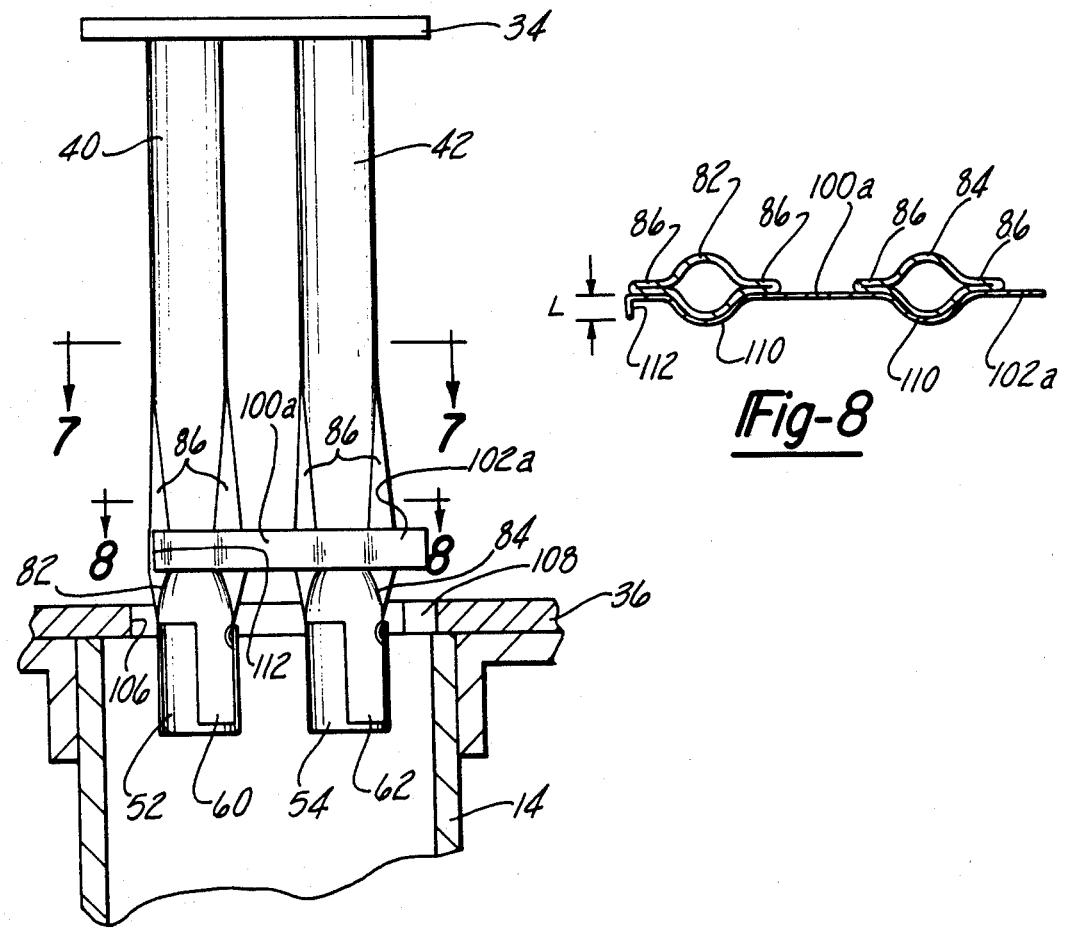
FIG. 6 is a fragmentary view generally similar to FIG. 4, but showing a modified form of the invention and showing the mixing tubes in rear elevation.
FIG. 7 is a sectional view on line 7—7 of FIG. 6.
FIG. 8 is a sectional view on line 8—8 of FIG. 6.

The form of the invention shown in FIGS. 6-8 is similar to the form described above except for the configuration of tie-strut member 100a and the method of securing it to mixing tubes 40,42. Member 100a is essentially a flat metal strap but is provided with portions 110 shaped to fit the curvature of portions of venturi throats 82,84 as shown in FIG. 8. Strap 100a is secured to the mixing tubes by suitable means such as spot-welding or soldering to one or both of the pinched regions 86 of each mixing tube.

Strap 100a has an end portion 102a which extends laterally outwardly of one of the mixing tubes and another end portion 112 which extends laterally outwardly in the opposite direction to about the outer edge of a pinched region 86 of the other mixing tube. End 112 is also disposed at an angle to the general plane of strap 100a to form a lug having a length L (FIG. 8) which is greater than the circumferential width W of slot 108 (FIG. 7).

Use and functioning of the FIGS. 6-8 form of the invention is in general similar to that of the FIGS. 1-5 form with the exception of lug 112. In some instances, it is possible for a person not aware of the purpose of strap end 102 and possessed of a good deal of determination and strength, to jimmy strap end 102 past opening 106 with shutters 60,62 facing away from opening 88 instead of toward it. Lug 112 is a back-up feature which prevents this from happening.

Should the assembler lower the mixing tubes into opening 106 with strap end 102a pointing away from slot 108 rather than aligned therewith, lug 112 aligns with slot 108. Since the circumferential extent of lug 112 exceeds the circumferential width of slot 108, the lug cannot enter the slot and the assembler is prevented from further lowering the mixing tubes into stanchion 14. In order to do so, the assembler must rotate the burner-mixing tube assembly until strap end 102a is aligned with slot 108 whereupon the assembly can be lowered to its operative position as described above.

I claim:

1. In a gas burner assembly having at least two burner sections and support means therefor, a corresponding number of fuel gas supply valves, a mixing tube for each valve having an upsteam end for receiving gas from the valve and a downstream end in gas delivering relation to a said burner section, said valves being mounted in a housing having an access opening, each mixing tube having a primary air opening adjacent its upstream end adjustable by a shutter, said shutters having adjustment means at like sides of said mixing tubes accessible through said access opening in assembled relation of said parts, said support means having a wall with an opening through which said mixing tubes are insertable to position said upstream ends in gas receiving relation to outlets on said valves, improved structure which comprises, a substantially rigid member anchored to and extending between said mixing tubes, said member forming a strut and a tie effective to retain said upstream ends in properly positioned relation to said valve outlets against thermal warpage of said parts incidental to operation of said burner sections, said member having a portion which projects laterally of said mixing tubes to such an extent that the lateral dimension of the combined member and mixing tubes is greater than the general cross dimension of said wall opening, said wall having a notch which opens into said wall opening and extends outwardly thereof laterally of said mixing tubes, said wall opening and notch having a combined lateral dimension greater than that of said member and mixing tubes and said portion of said member being dimensioned to pass through said notch whereby to facilitate insertion of said mixing tubes through said wall opening when said portion is aligned with said notch, said notch being so located that when said member portion is aligned therewith said adjustment means face in the direction of said access opening to insure accessibility of said adjustment means through said access opening when said upstream ends are inserted into gas receiving relation to said valve outlets.

2. The structure defined in claim 1 wherein said member is located generally adjacent said adjustment means.

3. The structure defined in claim 2 wherein said downstream ends of said mixing tubes are anchored to a common plate in turn anchored to said burner sections.

4. The structure defined in claim 1 wherein each mixing tube has a venturi restriction immediately longitudinally downstream of said adjustment means, each restriction having a throat, said member being anchored to the exteriors of the portions of said mixing tubes forming said throats.

5. The structure defined in claim 4 wherein said member comprises a metal strap having a thickness, a width greater than said thickness extending longitudinally of said tubes, and a length greater than said width extending laterally of said tubes.

6. The structure defined in claim 5 wherein said strap is substantially flat.

7. The structure defined in claim 1 wherein said portion of said member projects laterally away from one of said tubes, said member having another portion which projects laterally away from the other of said tubes and in a direction lateral of the first said portion, said other portion having a dimension in said direction which is greater than the width of said notch measured in said direction so that said other portion cannot pass through said notch.

8. The structure defined in claim 7 wherein said other portion projects in said direction away from a laterally outer edge portion of said other tube.

9. The structure defined in claim 8 wherein said direction is generally at a right angle to the first said portion.

10. The structure defined in claim 7 wherein said other portion projects in said direction away from a laterally outer edge portion of said other tube, said direction being generally at a right angle to the first said portion, each mixing tube having a venturi restriction immediately longitudinally downstream of said adjustment means, each restriction having a throat, said member having portions shaped to fit around portions of said throats, said member being anchored to the exteriors of portions of said mixing tubes laterally adjacent said throats.

11. The structure defined in claim 1 wherein each said mixing tube has a venturi restriction immediately longitudinally downstream of said adjustment means, each restriction having a throat, said member being anchored to the exteriors of portions of said mixing tubes laterally adjacent said throats.

12. The structure defined in claim 11 wherein said member has portions shaped to fit around portions of said throats.

* * * * *